(12) United States Patent
Celli

(10) Patent No.: US 6,183,532 B1
(45) Date of Patent: Feb. 6, 2001

(54) METHOD FOR STERILIZING SOILS

(75) Inventor: Alfredo Celli, Forli' (IT)

(73) Assignee: Alce Garden S.R.L. (IT)

(*) Notice: Under 35 U.S.C. 154(b), the term of this patent shall be extended for 0 days.

(21) Appl. No.: 09/031,852

(22) Filed: Feb. 27, 1998

(30) Foreign Application Priority Data

Feb. 28, 1997 (IT) .............................................. BO97A0115

(51) Int. Cl.⁷ ............................ C05D 3/02; A01C 15/00; A01G 11/00

(52) U.S. Cl. .......................... 71/61; 71/41; 71/62; 71/63; 47/1.01 F

(58) Field of Search ................................ 71/903, 25, 62, 71/41, 61, 63; 47/DIG. 10, 1.01 F; 423/324

(56) References Cited

U.S. PATENT DOCUMENTS

| | | |
|---|---|---|
| 2,272,190 | 2/1942 | Burr et al. |
| 5,082,488 * | 1/1992 | Van Mao ................................. 71/62 |
| 5,085,681 * | 2/1992 | Boukidis ................................. 71/29 |
| 5,094,680 * | 3/1992 | Lee ......................................... 71/33 |
| 5,259,327 * | 11/1993 | Thompson, Jr. et al. ............. 111/118 |

(List continued on next page.)

FOREIGN PATENT DOCUMENTS

| | | |
|---|---|---|
| 0393992 | 10/1990 | (EP) . |
| 0593802 | 4/1994 | (EP) . |
| 0601245 | 6/1994 | (EP) . |
| 0711612 | 5/1996 | (EP) . |
| 0918840 | 3/1947 | (FR) . |
| 1463474 | 3/1967 | (FR) . |
| 2445104 | 7/1980 | (FR) . |
| 355125186 * | 9/1980 | (JP) ...................................... 71/903 |
| 407275837 * | 10/1995 | (JP) ...................................... 71/903 |
| 8201977 | 6/1982 | (WO) . |
| 9418435 | 8/1994 | (WO) . |

OTHER PUBLICATIONS

Rechcigl, J.E., "Soil Amendments and Environmental Quality", p119–112, 1995.*
Moyls, et al, "In Situ Soil Steaming for the Control of Apple Replant Disease", Applied Engineering in Agriculture, p59–63, Jan. 1994.*
Kummeler, M., "Investigations into the Causes of Soil Sickness in Fruit Tree", p162–168, 1981.*
Francis, Harry L., "The Importance of Maintaining a Balance in Nature", p1–3, 1900.*

Primary Examiner—Steven P. Griffin
Assistant Examiner—Elin A Warn
(74) Attorney, Agent, or Firm—Orum & Roth

(57) ABSTRACT

The present invention relates to a method for sterilizing soils and of the equipment related thereto. The method includes sequentially at least the following phases: dispersion into the soil of at least one compound, solid, liquid or gaseous, able to react exothermically with water and/or steam, or other substance; injection of at least one jet of water and/or steam, or of another substance, into the soil in such a way as to produce heat in the subsequent reaction with the compound. Between the two aforesaid phases it is convenient to proceed to break up the soil to favor its mixing with the compound and create the best conditions for the reaction. The equipment suitable to carry out this method includes autonomous locomotion apparatus to be able to reach the open countryside, a tank to transport water or another suitable substance and a related appendage to convey it into the soil, a second tank for the compound that is to react exothermically with water and/or steam, or, in general, with the substance transported in the first tank, and apparatus for dispensing the compound into the soil. It can also be provided with a boiler to heat or vaporize the reactant contained in the tank, as well as an agricultural tool to favor the mixing of the compound, the penetration of the reactant into the soil and the subsequent reaction thereof.

12 Claims, 1 Drawing Sheet

U.S. PATENT DOCUMENTS

| | | |
|---|---|---|
| 5,385,106 | 1/1995 | Langshaw . |
| 5,406,747 | 4/1995 | Kiefl .................................. 47/1.42 |
| 5,416,248 * | 5/1995 | Matsumoto et al. ................ 588/249 |
| 5,417,861 * | 5/1995 | Burnham ............................ 210/609 |
| 5,553,414 | 9/1996 | Chapman et al. ................... 47/1.42 |
| 5,568,895 | 10/1996 | Webb et al. ......................... 241/16 |
| 5,622,123 * | 4/1997 | Rajamannan ....................... 111/120 |
| 5,867,935 * | 2/1999 | Brown ................................ 47/1.01 |
| 5,900,387 * | 5/1999 | Rines .................................. 504/116 |

* cited by examiner

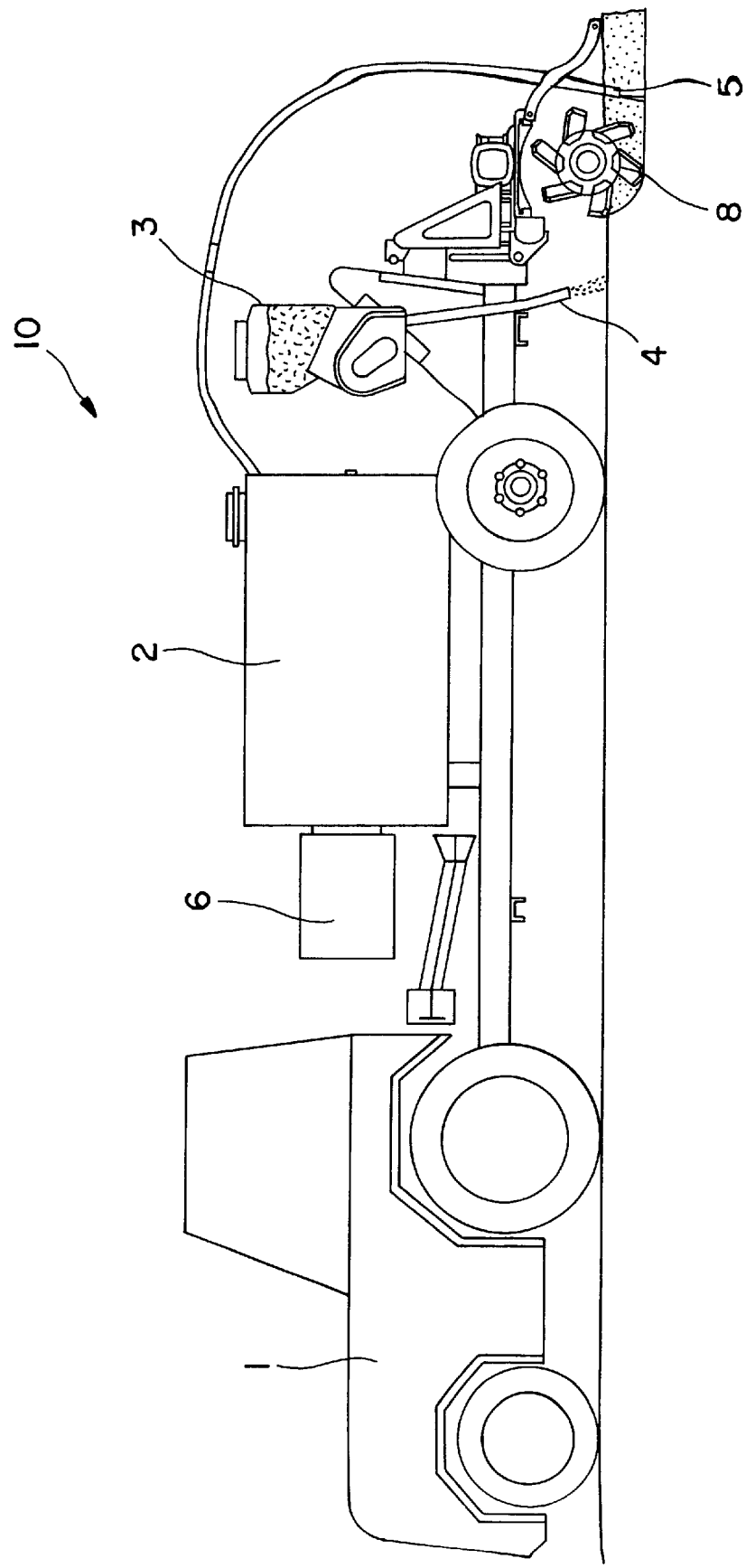

METHOD FOR STERILIZING SOILS

BACKGROUND OF THE DISCLOSURE

The present invention relates to a method for sterilizing soils and to the equipment related thereto.

The growing specialization in crops and the so-called single-crop systems, particularly widespread in the sector of ornamental plants, garden vegetables, corn and beet, generate a strong interaction between the microflora of the soil and the radical system of the plants.

Moreover, numerous vegetable and animal parasites can survive in the soil even for many years, until they come in contact with plants prone to suffer from their pathogenetic action.

The continued cultivation of such plants in the same soil thus leads to ailments in their growth and to a progressive deterioration in harvest yields. The first and most ancient way to obviate this problem consists of the so-called "crop rotation" or, more generally, of prolonging the interval during which a crop remains absent from a soil. In this situation, the soil dwelling parasites of the plant itself progressively die due to "starving".

However, there are cases wherein the "rotation" method does not provide sufficient reliability: many parasites are able to survive as parasites of other plants or remaining in a state of quiescent life; other times, abandoning a certain crop for a given period may not be economically advantageous. It is then necessary to resort to rather energetic interventions, which must therefore be applied only on the bare soil, some time before planting a new crop. These are rather onerous processes that accomplish the disinfection or disinfestation by means of chemical or physical interventions.

Chemical interventions consist of the administration of fungicides, insecticides, plant protection products or fumigation products: such intervention are long, very costly and highly hazardous for environmental pollution. After their execution, rather long time intervals are required before it is possible to proceed with the cultivation of the treated soil.

Physical interventions essentially consist of administering heat to the soil, heat which can be produced and distributed in various ways. As a rule, regardless of the methods used, heating the soil up to 80–90° C. is sufficient to kill all parasites present. This type of operation allows to start cultivation a short time afterwards, as soon as the temperature of the soil drops to 25–30° C.

Among physical interventions, treatments with dry heat, performed by heating the soil in the so-called country ovens, are the least effective ones, both because the results they yield are not always satisfactory, and because in any case they can only be applied to small plots of land.

Sterilization with boiling water entails prohibitive expenses and it is only plausible for very small plots of land.

Steam treatment finds applications for soil disinfection in greenhouses, stable seed-beds or small open plots: it can be accomplished both introducing the soil into large cement tanks, or in other containers, then passing through the soil both the steam produced by a generator and fixed or movable tools positioned on or within the soil to be disinfected.

In this latter case, the steam, produced by an appropriate generator, moves through pipes which lead it to the aforesaid dispensing tools of various designs. Use is made of hood dispensers, similar to upside down cases or to canvas sheets with the edges stuck in the soil, wherein the steam is inserted, or even comb dispensers, comprising a horizontal pipe wherefrom a series of vertical pipes depart which convey the steam into the soil. Hood dispensers are particularly indicated when the sterilization has to reach depths in the order of 20–25 cm, comb dispensers for greater depths. Lastly it is possible to use large self-propelled machines, able to intervene autonomously.

Only sufficiently profitable cultivations, for instance floriculture, justify the use of this system which presents, for wide open spaces, logistically insurmountable difficulties.

SUMMARY OF THE INVENTION

The object of the present invention is to provide a method for sterilizing soils, and equipment related thereto, eliminating the drawbacks mentioned above.

The invention, as it is characterized by the claims, solves the problem of making soil sterilization practically feasible also in wide open spaces, for instance in the country, exploiting known chemical reactions of the exothermic type.

One of the advantages obtained through the present invention consists essentially of the fact that energy consumption for steam production, or for water heating, is drastically reduced. Consequently, lighter machines can be used which, on one hand, contribute further to reduce consumption, on the other hand make it easier to carry out the sterilization in the open country.

Another important advantage consists of the fact that, to perform the exothermic reaction, it is possible to employ substances which are beneficial to the soil also from other viewpoints, for instance to redress its pH balance or to fertilize it.

The result of the exothermic reaction could even be in turn a substance acting as a fertiliser for the soil thus treated.

BRIEF DESCRIPTION OF THE DRAWING

The invention is described in more detail hereafter with the aid of the drawing which shows an embodiment provided purely by way of non limiting example:

a schematic side view of the equipment.

DESCRIPTION OF THE PREFERRED EMBODIMENTS

As can be observed in the drawing, the equipment (10) comprises autonomous means of locomotion (1), a tank (2) for transporting a reactant, for instance water, and at least one appendage (5) to convey such reactant into the soil. Since for displacements in the open country the equipment (10) described must be able to move freely, the aforesaid means of locomotion (1) can consist of a tractor or of an engine integral to the chassis of the equipment (10) itself.

In order to produce an exothermic reaction within the soil, the equipment (10) further comprises a second tank (3) for a compound that is to react exothermically with water and/or steam, or with any other suitable substance, and means (4) for dispensing said compound into the soil.

Since the heat produced by the chemical reaction is affected by the compound used, and the latter may vary according to other requirements, soil sterilization, i.e. the suppression of the parasites, will be obtained by injecting water or another substance at an optimal temperature to be assessed on a case by case basis. Therefore, it may be necessary to heat the water or even to vaporize it before injecting it into the soil. To this end, the equipment (10) can comprise a boiler (6), able to vaporize the water to be injected into the soil or, more in general, to raise the temperature of the reactant.

Since it is certainly desirable to create the best conditions for a uniform sterilization of the soil, the latter could be broken up beforehand with a mechanical hoe or a harrow. The optimal solution however consists of providing the equipment (10) in question with an agricultural tool (8) such as the aforesaid ones, interposed between the means (4) for dispensing the compound which is to react exothermically with the reactant contained in the first tank (2) and the appendage (5) to convey such reactant into the soil, so as to disperse the compound into the soil and favor the penetration therein of water and/or steam, or, in general, of the substance used.

The equipment (10) described above is functional to carry out a method to sterilize soils, also new and original, which could be carried out also with other machinery while still maintaining its innovative characteristics. Such method comprises sequentially at least the following phases:

dispersing into the soil at least one compound able to react exothermically with water and/or steam, or other suitable substance;

injecting at least one jet of water and/or steam into the soil, or of another substance, in order to obtain an exothermic reaction with the compound previously dispersed therein.

As has been mentioned above, it is convenient for the method to comprise, between the dispersion of the compound and the injection of water and/or steam, or of any other substance, an intermediate phase consisting of breaking up the soil, in order to favor the dispersion of the compound and to create the best conditions for the exothermic reaction to take place.

The compound, usable in solid, liquid or gaseous form, could advantageously be constituted by a fertilizer or a supplementer, i.e. by a substance that is also able to re-balance the nature of the soil, towards a greater acidity or a greater alkalinity, depending on the crops to be planted.

Purely by way of example, one could use quicklime (CaO), caustic soda (NaOH) and caustic potash (KOH) for acid soils or orthophosphoric acid ($H_3PO_4$) for alkaline soils. While the former give rise with water ($H_2O$) to strongly exothermic reactions, wherein hydroxyl ions ($OH^+$) are freed which raise the pH value, orthophosphoric acid reacts exothermically with water producing hydrogen ions ($H^+$) which reduce the pH value. In all examples mentioned above, moreover, essential substances for the development of the crops are released in ionic forms, respectively calcium, sodium, potassium and phosphorus.

Alternatively, to heat the soil, exothermic reactions could be provoked using materials with porous microstructure or natural or synthethic zeolites.

To these substances could be added a neutral substance, such as a fertilizer of natural origin rich in organic substances and in micro-organisms useful to the plants, particular well suited for restoring the bacterial microflora, for the most part eliminated by the heat produced in the course of the sterilization.

The invention thus conceived can be subject to numerous modifications and variations, without thereby departing from the scope of the inventive concept. Moreover, all components may be replaced with technically equivalent elements.

In practice, modifications and/or improvements are obviously possible without thereby departing from the scope of the following claims.

What is claimed:

1. A method for sterilizing soils, comprising:

applying a first and a second reagent to the soil;

causing an exothermic reaction between reagents such that the heat from the exothermic reaction kills organisms in the soil including crop parasites and pathogens.

2. The method according to claim 1, wherein said first reagent is dispersed in said soil, and said second reagent is subsequently injected into said soil.

3. The method according to claim 1, wherein said first reagent is comprised of one of a solid, liquid and gas, and said second reagent is comprised of one of water and steam.

4. The method according to claim 2, further comprising an intermediate phase of breaking up said soil occurring after said first reagent is dispersed in said soil, and before said second reagent is injected into said soil.

5. The method according to claim 1, wherein said exothermic reaction results in one of a supplementer and a fertilizer.

6. The method according to claim 1, wherein said first reagent is comprised of a neutral substance.

7. The method according to claim 1, wherein one of said first and second reagents is comprised of substances having a porous microstructure.

8. The method according to claim 1, wherein one of said first and second reagents is comprised of one of a natural and synthetic zeolite.

9. The method according to claim 1, wherein one of said first and second reagents is heated.

10. A method for sterilizing soil while said soil remains on the ground, comprising the following steps:

dispersing at least one compound able to react exothermically with water into soil without removing said soil from the ground;

injecting one of a jet of water, hot water, and steam into said soil resulting in an exothermic reaction with said at least one compound previously dispersed within said soil using the heat generated from the exothermic reaction to kill parasites and pathogens entrapped in the soil, thereby sterilizing said soil.

11. The method according to claim 10, wherein said at least one compound is a reagent selected from the group consisting of CaO, NaOH and KOH.

12. The method according to claim 10, wherein said at least one compound is $H_3PO_4$.

* * * * *